Oct. 11, 1938.  J. W. McFARLANE  2,132,694

CAMERA ATTACHMENT

Filed Jan. 7, 1937

John W. McFarlane
INVENTOR.

BY
ATTORNEYS

Patented Oct. 11, 1938

2,132,694

UNITED STATES PATENT OFFICE 2,132,694

CAMERA ATTACHMENT

John W. McFarlane, Rochester, N. Y., assignor to Eastman Kodak Company, Rochester, N. Y., a corporation of New Jersey Application January 7, 1937, Serial No. 119,479

5 Claims. (Cl. 95—81)

This invention relates to light filters of the kind which polarize light. More particularly it relates to the photographic use of sheet polarizing materials.

According to the wave theory of light propagation, ordinary light may be considered as vibrating in all directions perpendicular to its direction of propagation. For many years, it has been known that ordinary light on passing through a polarizer, such as a Nicol prism, becomes polarized with the planes of vibration of the emergent light, mutually parallel. The orientation of these planes of vibration is determined by the structure of the polarizer with respect to which there is thus a unique direction which for convenience in describing the invention, I shall call the "vibration axis" of the polarizer.

Those skilled in the art are familiar with many of the desirable effects which may be obtained photographically when a polarizing filter is placed over a camera lens. In this connection, it is desirable to know the direction of the vibration axis of the polarizing filter. It is an object of this invention to provide a sheet polarizing filter having means which conveniently indicate the orientation of this vibration axis. The invention is particularly advantageous when used with cameras which are not provided with means for ground glass focusing.

One particularly useful application of polarizing filters is in obtaining dark sky or enhanced cloud effects, particularly in connection with color photography where the use of ordinary color filters is prohibited. In this connection, advantage is taken of the fact that sky light, from those portions of the sky which are separated from the sun approximately 90 degrees, is partially polarized. To obtain the maximum darkening of the sky, it is necessary to have the vibration axis of the polarizing filter pointing directly toward the sun. It is, therefore, a particular object of this invention to provide a polarizing filter having indicating means which will enable the user accurately to orient the camera and the filter with respect to the sun in a simple manner.

Other objects and advantages of the present invention will become apparent from the following description when read in connection with the accompanying drawing in which.

Figure 1A:
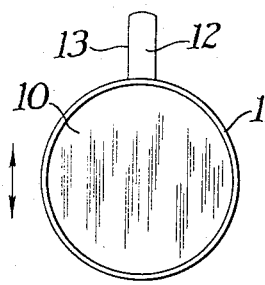
Figure 1 shows three views, an elevation, a vertical cross-section and a perspective view as Figs. 1A, 1B and 1C, respectively, of one form of the invention.
Figure 1B:
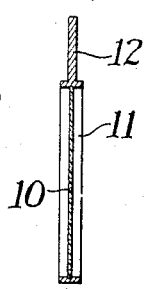
Figure 1C:
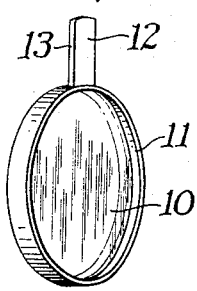

In Figure 1, a disk of sheet polarizing material 10, is mounted in a ring 11 which may be attached to a camera lens in any well-known manner which will permit the filter to be rotated in its own plane. The vibration axis of the filter is indicated by a double point arrow at the left of the figure. A handle 12 having parallel sides 13 is attached to the ring 11 so that the sides 13 are parallel to the vibration axis. Thus, when this filter is mounted on a camera lens, the handle 12 indicates the orientation of the vibration axis and if the camera and the filter are rotated so that the handle 12 points directly toward the sun, the camera will photograph that part of the sky for which the maximum dark sky effect is obtainable and the filter will be correctly oriented to obtain this effect. When correctly and accurately oriented for maximum dark sky effects, the handle 12 will cast no apparent shadow on the ring 11. This arrangement makes possible a very accurate adjustment of the polarizing filter since the sides 13 of the handle 12 are accurately parallel to each other and to the vibration axis.

Figure 2A:
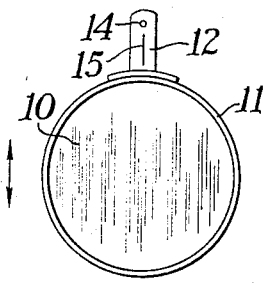
Figure 2 shows the same three views of another form of this invention, as Figs. 2A, 2B and 2C, respectively.
Figure 2B:
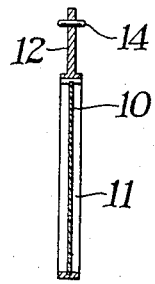
Figure 2C:
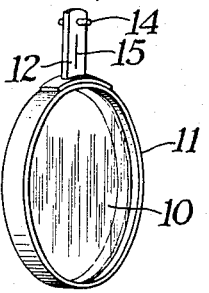

This arrangement shown in Figure 2 is similar to that in Figure 1, and in addition has a small post 14 extending through the handle 12 and perpendicular to the plane of the polarizing material 10. When the camera and the polarizing filter are oriented properly with respect to the sun, the post 14 casts a shadow which falls along an index line 15 which is ruled on the handle 12.

Figure 3A:
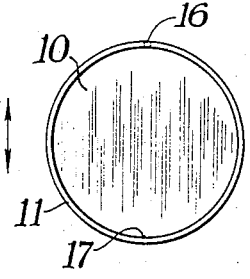
Figure 3 shows the same views of a third form of the invention, as Figs. 3A, 3B and 3C, respectively.
Figure 3B:
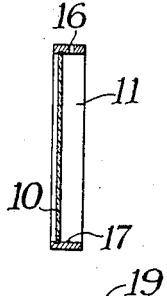
Figure 3C:
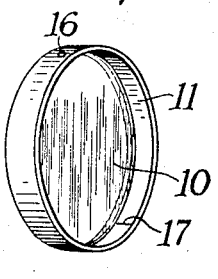

Figure 3 shows another form of the invention wherein the handle is eliminated and the orientation of the filter with respect to the sun is determined by means of a beam of light rather than a shadow. In this embodiment a suitable light beam defining means such as a hole 16 in one side of the ring 11 and a suitable index mark 17, provided on the inside of the ring 11 diametrically opposite the hole 16 so that a line drawn between the hole 16 and the line 17 is parallel to the plane of vibration of the polarizing filter, cooperate to indicate that the filter is properly oriented when the light from the sun passing through the hole 16 falls exactly on the line 17.

Figure 4:
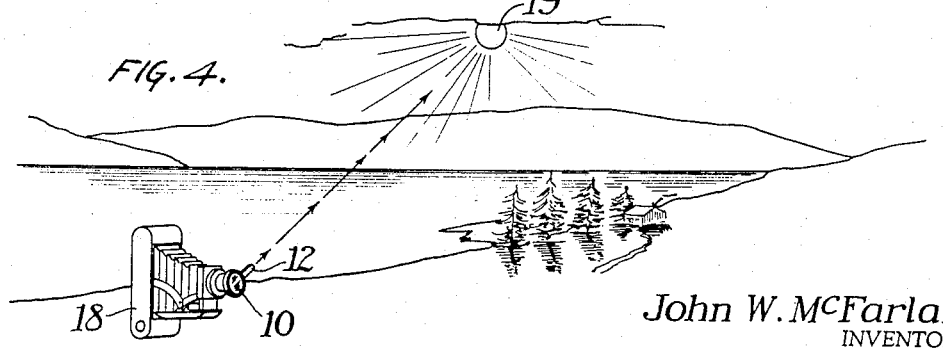
Figure 4 is an outdoor scene illustrating how the invention is used to indicate the orientation of the camera and of the polarizing filter with respect to the sun.

In Figure 4 a camera 18 is provided with a polarizing filter 10 in front of its lens. In accordance with the invention, this filter 10 is provided with a handle 12 similar to that shown in Figure 1 and which is parallel to the vibration axis of the polarizing filter 10. The camera 18 and the indicator handle 12 as shown are oriented properly for maximum dark sky effects, since the handle 12 points toward the sun 19 as indicated by small arrows.

For purposes of illustration I have shown several of the many forms which this invention may take. It is to be understood, however, that the invention is not limited to the specific structures shown but is of the scope of the appended claims.

The similarity of these forms of the invention is obvious. In order to define them in the accompanying claims I refer to the edge 13 of Fig. 1, the knob 14 of Fig. 2 and the hole 16 of Fig. 3, all of which perform similar functions, as shadow casting means. The shadow of the hole 16 is of course a spot of light.

Similarly, the line of junction between the edge 13 and the mount 11, the line 15 and the line 17 may each be called a shadow indicating index.

What I claim and wish to secure by Letters Patent of the United States is:

1. A polarizing filter adapted for use on photographic cameras, comprising a sheet polarizing material having a vibration axis, a mount for said sheet polarizing material and a handle for said filter attached to and projecting from said mount, said handle being provided with a shadow casting means and a shadow indicating index said shadow casting means and said index being on a line parallel to the vibration axis whereby they, when illuminated, cooperate to indicate when said vibration axis is pointing toward the source of illumination.

2. A filter attachment adapted to be mounted on photographic cameras comprising a filter of light polarizing material having a vibration axis, a mount for the filter, a shadow casting means secured to the mount, a shadow-indicating index carried by the mount and so positioned with respect to the shadow casting means and said vibration axis that when the vibration axis is pointing toward a source of light, the corresponding shadow cast by said means falls on said index.

3. A device for orienting, with respect to a source of light, a camera and a polarizing filter rotatably mounted thereon so that the vibration axis of the filter points toward said source of light, which device comprises a mount for the filter, a shadow casting means on said mount and an indicating means also on said mount cooperating with said shadow casting means, said indicating means being so positioned relative to said shadow casting means and to said vibration axis that said shadow casting means casts a shadow spaced from said indicating means when the vibration axis is pointing other than toward the source of light and casts a shadow upon the indicating means when the vibration axis is pointing toward the source of light, whereby said shadow casting means and indicating means cooperate to indicate when the filter is oriented so that its vibration axis is pointing toward the source of light.

4. A filter attachment adapted to be rotatably mounted on a photographic camera, comprising a light polarizer having a vibration axis, a mount for the filter and a handle having its base secured to the mount, said handle having side portions so shaped and positioned relative to the vibration axis that when said axis is pointing toward a source of light, said portions cast no apparent shadow.

5. A device for determining the orientation with respect to a source of light, of a camera and a polarizing filter rotatably attached to the lens thereof, which device comprises a mount for said filter, a light transmitting opening in said mount and an indicating index on said mount, said opening and said index being so positioned relative to said vibration axis that when the light transmitted by the opening falls on the index, the vibration axis is pointing toward the source of light.

JOHN W. McFARLANE.